United States Patent Office 3,651,007
Patented Mar. 21, 1972

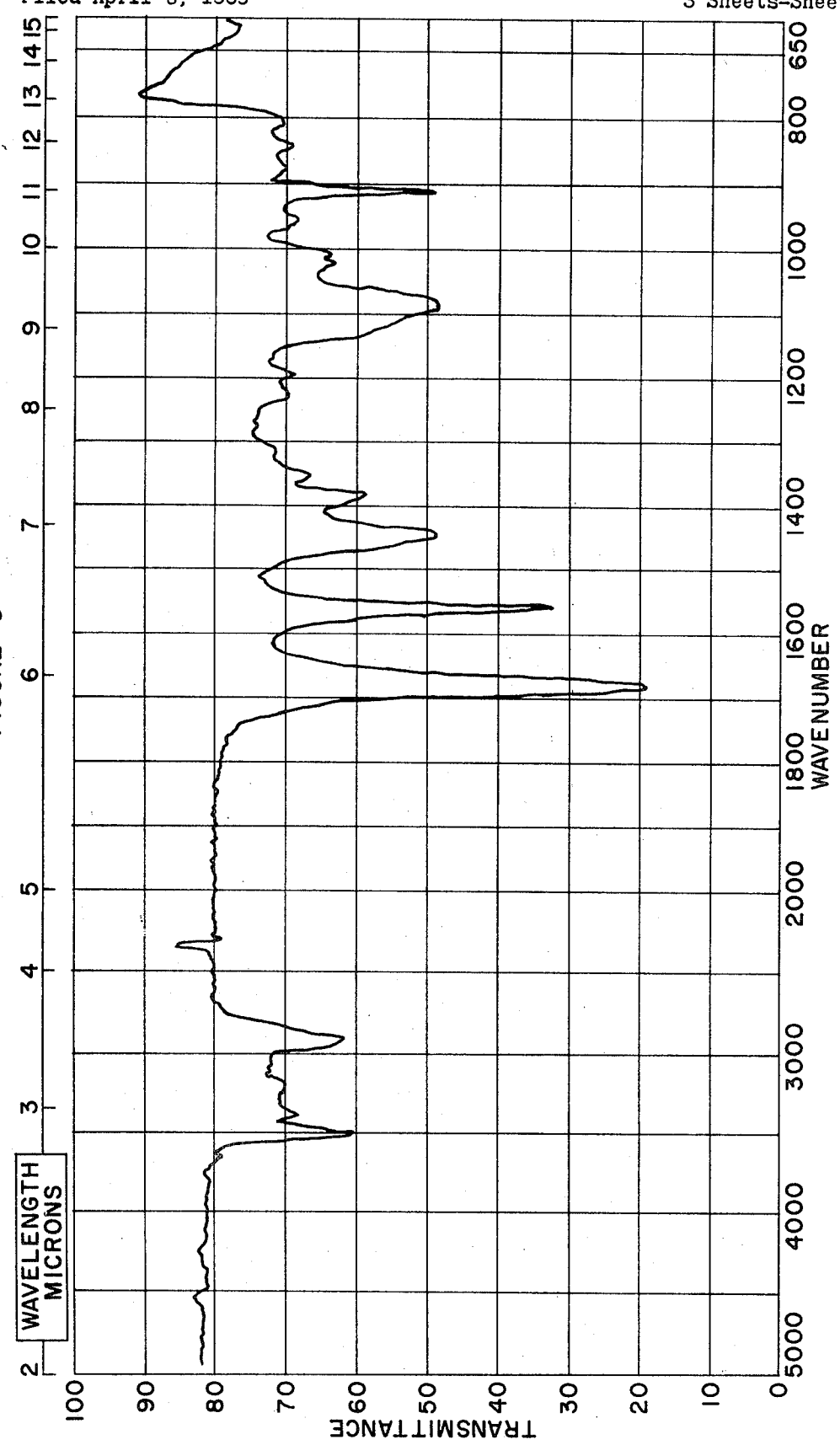

3,651,007
EPOXIDES
Hans-Peter Sigg, Binningen, and Christian Stoll, Basel, Switzerland, assignors to Sandoz Ltd. (also known as Sandoz AG), Basel, Switzerland
Filed Apr. 8, 1969, Ser. No. 814,388
Claims priority, application Switzerland, Apr. 16, 1968, 5,564/68, 5,566/68, 5,567/68
Int. Cl. C07d 1/18
U.S. Cl. 260—348 R                    3 Claims

ABSTRACT OF THE DISCLOSURE

The invention provides new antibiotics derivatives of formula

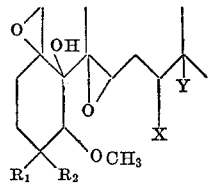

Figure 1:
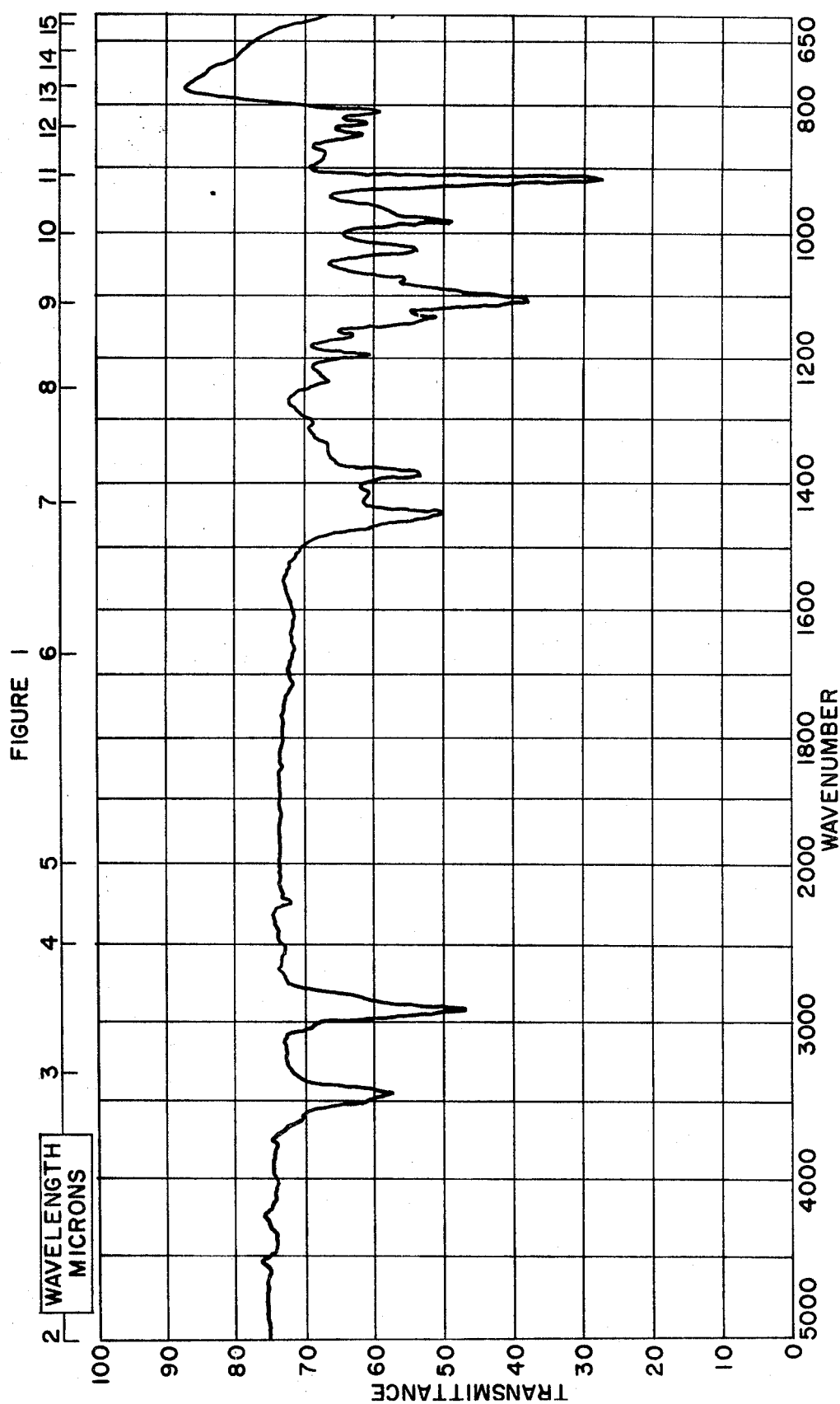

in which either:

(i)

X and Y together form a second bond between the carbon atoms to which they are attached,
$R_1$ is a hydrogen atom, and
$R_2$ is a hydroxyl group, (ii)

X and Y together with the carbon atoms to which they are attached form an epoxy group, and
$R_1$ and $R_2$ together form the oxo group =O, or (iii)

X and Y together are a second bond between the carbon atoms to which they are attached and
$R_1$ and $R_2$ together form the radical

=N—NH—CO—NH$_2$

The new antibiotic derivatives are useful in inhibiting the production of antibodies and the formation of cellular immunity reactions.

---

The present invention relates to new antibiotic derivatives of Formula V,

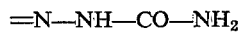

in which either:

(i)

X and Y together signify a second bond between the carbon atoms to which they are attached,
$R_1$ signifies a hydrogen atom, and
$R_2$ signifies a hydroxyl group, (ii)

X and Y together with the carbon atoms to which they are attached signify an epoxy group, and
$R_1$ and $R_2$ together form the oxo group =O, or (iii)

X and Y together signify a second bond between the carbon atoms to which they are attached, and
$R_1$ and $R_2$ together signify the radical

=N—NH—CO—NH$_2$

It will readily be seen that Formula V encompasses the following individual compounds of Formulae I, II and III:

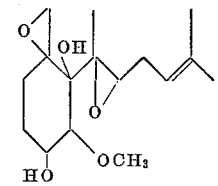
(I)

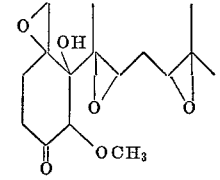
(II)

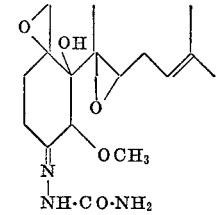
(III)

The new derivatives may be obtained in accordance with the invention:

(a) By reacting the antibiotic SL 1846 of Formula IV

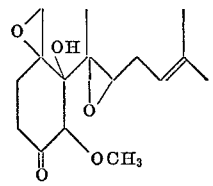
(IV)

with a hydride, preferably an alkali metal borohydride, to give the compound of Formula I;

(b) By reacting the antibiotic SL 1846 of Formula IV with an organic per acid or hydrogen peroxide to give the compound of Formula II;

(c) By condensing the antibiotic SL 1846 of Formula IV with semicarbazide or a salt thereof to give the compound of Formula III.

The reduction of the antibiotic SL 1846 in accordance with the preceding section (a) is preferably effected by adding a solution of an alkali metal borohydride, preferably sodium borohydride, in an inert solvent, e.g. dioxane, to the antibiotic SL 1846 in an inert solvent, e.g. dioxane, and allowing the mixture to stand for several hours at a temperature of about 0 to 25° C., preferably at room temperature. The new antibiotic derivative of Formula I obtained in this manner may subsequently be purified in manner known per se.

The reaction of the antibiotic SL 1846 with an organic per acid or hydrogen peroxide, in accordance with the preceding section (b), is preferably effected by adding a freshly prepared solution of an organic per acid, preferably perbenzoic acid, in an aprotic solvent, e.g. methylene chloride, ethylene chloride, chloroform or benzene, to the antibiotic SL 1846 in one of the solvents indicated above, and allowing the mixture to stand at a temperature below 30° C., preferably at room temperature. The epoxide of Formula II of the antibiotic SL 1846 obtained in this manner may subsequently be purified in manner known per se.

The condensation of the invention in accordance with the preceding section (c) is preferably effected by adding an acid-binding agent, e.g. sodium acetate or potassium carbonate, to an alcoholic solution of a salt of the semicarbazide, e.g. semicarbazide hydrochloride in methanol or ethanol, adding the resulting semicarbazide solution to an alcoholic solution of the antibiotic SL 1846 and allowing the mixture to stand for several hours at a temperature below 30° C., preferably room temperature. The semicarbazone of Formula III of the antibiotic SL 1846 obtained in this manner may then be purified in manner known per se.

The antibiotic SL 1846, used as starting material, may be produced in accordance with French patent specification No. 1,503,233.

As set forth in the French patent, the substance SL 1846 is prepared by cultivating a hitherto unknown strain of the fungus species *Pesudeurotium ovalis* Stolk in a nutrient solution and the substance is isolated from the fermentation solution and purified in known manner, e.g., by extraction or adsorption.

The strain of *Pseudeurotium ovalis* Stolk used in the preparation of SL 1846 was isolated from a soil sample from Rio de Janeiro and a specimen thereof has been deposited with the United States Department of Agriculture (Northern Utilization Research and Development Division), Peoria, Ill., USA, under the reference NRRL 3194.

The strain of the fungus species *Pseudeurotium ovalis* Stolk corresponds morphologically to the descriptions given by A. C. Stolk, Anton van Leeuwenhoek 21, 1955, and C. Booth, Mycological Papers No. 83, 1961.

It grows at 27° on malt-yeast agar with a compact, flat, grey-rose colored aerial mycelium. The cleistothecia develop on the substratum mycelium and are covered by aerial mycelium. They are round, red-brown and have a diameter of 90–180$\mu$. The transient asci measure 7.5–9 x 6.5–8$\mu$. They contain eight elliptical, flat, light brown or olive colored ascospores, measuring 5.5–6 x 3.5–4$\mu$. The Sporotrichum-like secondary fruit form develops simultaneously with the main fruit form.

It is also possible to prepare the compound SL 1846 using strains like those obtainable from the strain of *Pseudeurotium ovalis* Stolk, for example by selection or mutation by ultraviolet or X-ray irradiation or other measures, for example by treatment of laboratory cultures with suitable chemicals.

The strain of *Pseudeurotium ovalis* Stolk may be cultivated on various nutrient media containing the usual nutrients. Nutrients normally use for heterotrophic organisms are utilized for this strain: glucose, starch, dextrines, lactose, and cane sugar, for example, may be used as carbon source; organic or mineral nitrogen compounds such as peptones, yeast or meat extracts, ammonium sulphate, ammonium nitrate, and amino acids may be used as nitrogen source, as well as the usual mineral salts and trace elements.

Preferably, a liquid nutrient medium is inoculated with conidia or mycelium of the strain of *Pseudeurotium ovalis*. The cultivation, for example, is effected under aerobic conditions, in surface culture or in submerged culture while shaking or in fermenters while aerating with air or oxygen while stirring. The temperature at which the cultivation is effected may range between 20 and 35° C., but it is preferred to use a temperature between 25 and 30° C. and a pH value of 5–7, in which case the culture is incubated for 4 to 10 days.

One specially suitable method for isolating the antibiotic SL 1846 is the extraction of the culture filtrate with ethylene chloride, though other organic solvents, e.g., benzene, ethyl acetate, butyl acetate, chloroform or butanol, may also be used. Subsequently, the extracts are separated from the solvent, e.g., by distillation, and the residue purified chromatographically by absorbing agents, e.g., activated alumina, silica gel or magnesium silicate, or by means of counter current distribution, in order to isolate the desired antibiotic.

The antibiotic SL 1846 has the following characteristics: SL 1846 is a colorless, crystalline neutral compound having the gross formula $C_{16}H_{24}O_5$, a melting point of 89–92° C. and a specific rotation of $[\alpha]_D^{20} = -117°$ (c.=0.40 in chloroform). Ultraviolet spectrum: maximum at 284.5 m$\mu$ (log $\epsilon$=1.63) and a strong final absorption at 210 m$\mu$ (log $\epsilon$=3.1) (in methanol). Infrared spectrum: bands at 3500, approximately 3000, 1725, 1600, 1460, 1390, 1120, 1040, 1030, 1000, 970, 880, 840 cm.$^{-1}$ (in methylene chloride).

The new antibiotic derivatives are useful because they possess pharmacological activity in animals. In particular, the derivatives are useful in inhibiting the production of antibodies and the formation of cellular immunity reactions as is indicated by their strong or complete inhibitionary action against the formation of haemagglutinins in mice, rats, monkeys and guinea pigs which have been immunized with foreign erythrocytes, and their action in suppressing the symptoms of experimental allergic encephalomyelitis in rats and rabbits and in delaying the rejection of homologous skin transplantations in mice.

The toxicity of the antibiotic derivatives is low and the $LD_{50}$ (acute) in white mice is greater than 1000 mg./kg. i.p.

For the abovementioned use, the dosage administered will of course vary depending upon the compound employed, mode of administration, and treatment desired. However, in general, satisfactory results are obtained when administered at a daily dosage of from about 0.1 milligram to about 10 milligrams per kilogram of animal body weight which may be given in divided doses 1 to 4 times a day or in sustained release form. For the larger mammals, a suitable total daily dosage is in the range of from about 10 milligrams to about 700 milligrams, and unit dosage forms suitable for per os administration comprise from about 2.5 milligrams to about 700 milligrams of the antibiotic derivative admixed with a solid or liquid pharmaceutical carrier or diluent.

The new antibiotic derivatives may be used as medicaments on their own or in the form of appropriate medicinal preparations for enteral or parenteral administration. In order to produce suitable medicinal preparations the antibiotic derivatives are worked up with inorganic or organic, pharmacologically inert adjuvants. Examples of such adjuvants are:

For tablets and dragées: lactose, starch and talc

For syrups: solutions of cane sugar, invert sugar and glucose

For injectable solutions: water, alcohols, glycerin and vegetable oils

For suppositories: natural or hardened oils and waxes

The preparations may furthermore contain suitable preserving, stabilizing and wetting agents, solubilizers, sweetening and colouring substances and flavourings.

In the following examples which illustrate the process without in any way limiting the scope of the invention, all temperatures are indicated in degrees centigrade.

EXAMPLE 1

100 liters of a nutrient solution containing in 1 liter:

| | G. |
|---|---|
| Glucose | 20 |
| Malt extract (Schweiz. Ferment AG) | 2 |
| Bacto-yeast extract | 2 |
| Peptone | 2 |
| $KH_2PO_4$ | 2 |
| $MgSO_4 \cdot 7H_2O$ | 2 |
| Demineralized water to make up 1 liter. | | are inoculated in a fermenter with 10 liters of a pre-culture of *Pseudeurotium ovalis*, strain NRRL 3194 and incubated at 27° for 111 hours while aerating (75 liters of air per minute) and stirring (150 revolutions per minute).

The culture solution is filtered and the filtrate having a pH of 5–6 is extracted 3 times successively, each time with 50 liters of ethylene chloride. The ethylene chloride extract is washed once with 5 liters of water, dried over magnesium sulphate and evaporated to dryness in a vacuum after filtration. The residue is chromatographed on 300 g. of silica gel (Merck 0.2–0.5 mm.). For the elution, a mixture of chloroform and methanol is used in the proportion of 99.5 to 0.5, the fraction volume being 100 ml. The fractions 28–39 yield the crystalline, colorless compound SL 1846, having a melting point of 89–92°, from ether/pentane.

The 10 liters of preculture of *Pseudeurotium ovalis* were prepared with the same nutrient solution and under the same culture conditions as described above.

EXAMPLE 2

1.79 g. of sodium borohydride in 200 cc. of 80% dioxane are added portionwise to a solution of 7 g. of the antibiotic SL 1846 in 225 cc. of 80% dioxane (mixture dioxane/water 4:1). After standing at 20° for 5 hours the mixture is cooled to 0°, 200 cc. of 2 N $H_2SO_4$ are added and extraction is effected 5 times with 200 cc. amounts of chloroform. The extracts are washed twice with 100 cc. of water and dried over sodium sulphate and are then evaporated to dryness in a vacuum. The residue is chromatographed on 100 g. of silica gel. Elution is effected with ether, volume of the fractions 100 cc. After concentrating by evaporation fractions 4 to 11 yield the new antibiotic derivative of Formula I in the form of a colourless, oily liquid. $[\alpha]_D^{20} = -88°$ (c.=0.46 in chloroform). IR spectrum see FIG. 1.

EXAMPLE 3

Figure 2:
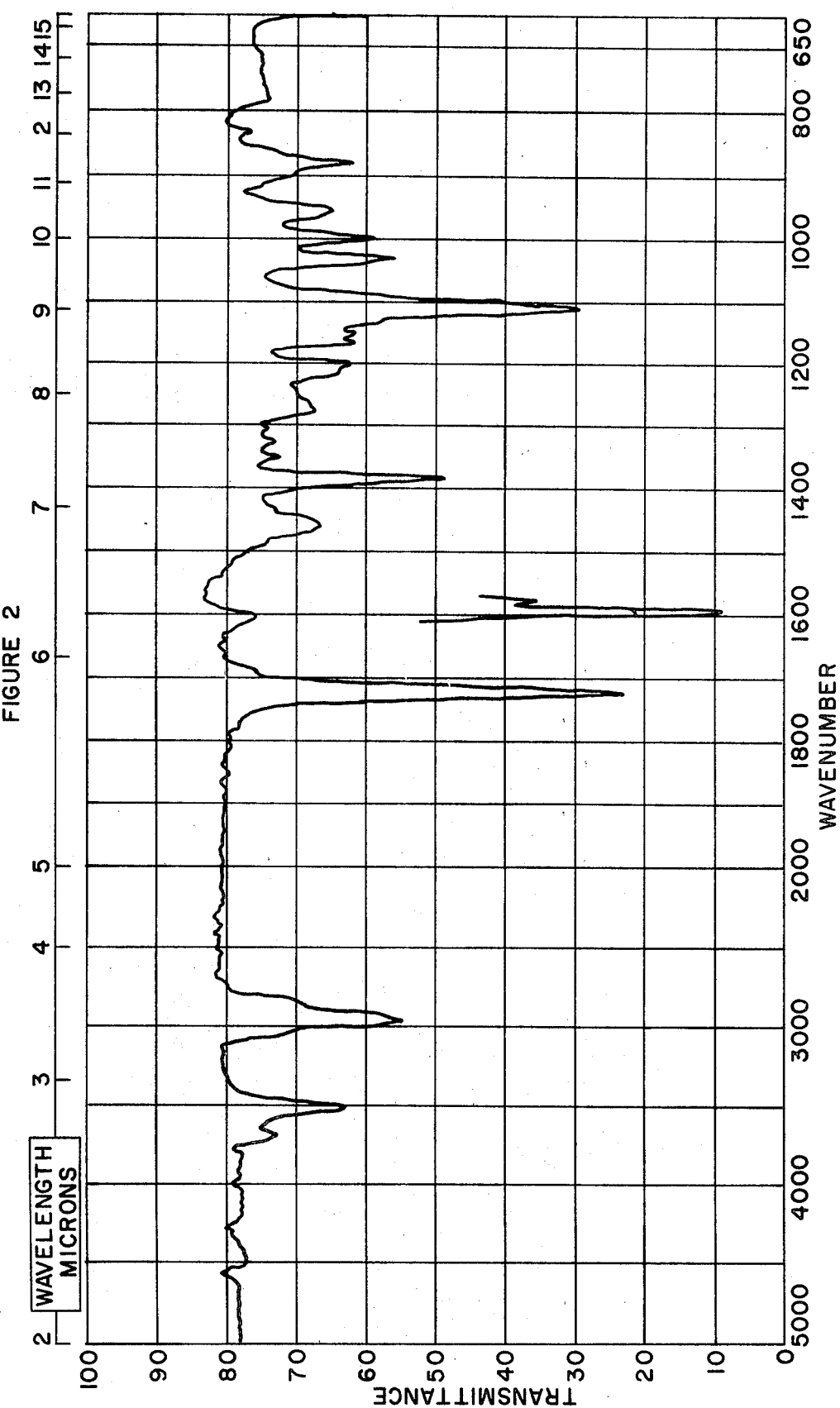

A freshly prepared solution of 1.6 g. of perbenzoic acid in 20 cc. of chloroform is added to a solution of 2 g. of the antibiotic SL 1846 in 300 cc. of benzene. The mixture is allowed to stand at 20° for 1½ hours. The mixture is then washed twice with 50 cc. of 2 N sodium carbonate and once with 50 cc. of water, the organic phase is dried over sodium sulphate, filtered and evaporated to dryness in a vacuum. The residue is chromatographed on 40 g. of silica gel. Elution is effected with chloroform/methanol (99:1), volume of the fractions 60 cc. Fractions 5 to 9 contain the pure epoxide of Formula II of the antibiotic SL 1846. After concentrating by evaporation a colourless, oily liquid is obtained. $[\alpha]_D^{20} = -80.5°$ (c.= 0.46 in chloroform). IR spectrum see FIG. 2.

EXAMPLE 4

4.1 g. of semicarbazide hydrochloride and 6.2 g. of sodium acetate·$3H_2O$ are triturated, 60 cc. of absolute methanol are added, filtration is effected and the filtrate is added to a solution of 2 g. of the antibiotic SL 1846 in 20 cc. of methanol. After standing at 20° for 20 hours the solution is evaporated to dryness in a vacuum. The residue is chromatographed on 70 g. of neutral aluminium oxide, activity III. Elution is effected with chloroform/methanol (99.1), volume of the fractions 100 cc. Fractions 2 to 6 yield a pure semicarbazone of Formula III, which is dissolved in a small amount of ether and added dropwise to a 10-fold quantity of pentane, whereby a crystalline precipitate, having an M.P. of 87–90°, is obtained. IR spectrum see FIG. 3.

What is claimed is:
1. A compound of formula:

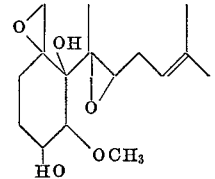

2. A compound of formula:

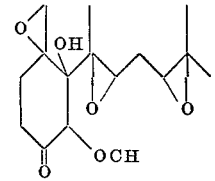

3. A compound of formula:

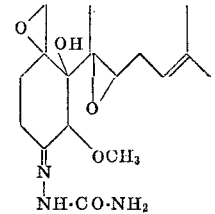

No references cited.

NORMA S. MILESTONE, Primary Examiner

U.S. Cl. X.R.

260—348 A; 424—278